United States Patent

Agarwal

Patent Number: 5,966,541
Date of Patent: Oct. 12, 1999

[54] TEST PROTECTION, AND REPAIR THROUGH BINARY-CODE AUGMENTATION

[75] Inventor: Anant Agarwal, Weston, Mass.

[73] Assignee: Incert Software Corporation, Cambridge, Mass.

[21] Appl. No.: 08/985,052

[22] Filed: Dec. 4, 1997

[51] Int. Cl.$^6$ ................................................ G06F 9/45
[52] U.S. Cl. ............................................... 395/712
[58] Field of Search ........................................... 395/712

[56] References Cited

U.S. PATENT DOCUMENTS

| | | | |
|---|---|---|---|
| 4,951,195 | 8/1990 | Fogg, Jr. et al. | 364/200 |
| 5,241,678 | 8/1993 | Futamura et al. | 395/700 |
| 5,428,786 | 6/1995 | Sites | 395/700 |
| 5,488,714 | 1/1996 | Skidmore | 395/500 |
| 5,546,586 | 8/1996 | Wetmore et al. | 395/705 |
| 5,615,369 | 3/1997 | Holler | 395/709 |
| 5,675,803 | 10/1997 | Preisler et al. | 395/704 |
| 5,732,275 | 3/1998 | Kullick et al. | 395/712 |
| 5,764,992 | 6/1998 | Kullick et al. | 395/712 |

OTHER PUBLICATIONS

Robert C. Bedichek, "Talisman: Fast and Accurate Multicomputer Simulation," 1995, Laboratory for Computer Science, Massachusetts Institute of Technology.

Robert C. Bedichek, "Some Efficient Architecture Simulation Techniques," Department of Computer Sciences, University of Washington, Usenix Conference, Jan., 1990.

Colin Hunter et al., "DOS at RISC," Byte, Nov., 1989, pp. 361–368.

Anant Agarwal et al., "ATUM: A New Technique for Capturing Address Traces Using Microcode," Proceedings of the 13th Annual Symposium on Computer Architecture, Jun. 1986.

Kazuhito, Patch system, Patent abstracts of Japan (CD–ROM), Unexamined Appliations, vol. 94, No. 11, Nov. 8, 1994.

International Business Machines Corporation, Generic Methodology for Code Patching in Binary File, 802–803, Jun. 1998.

*Primary Examiner*—Tariq R. Hafiz
*Assistant Examiner*—Wei Zhen
*Attorney, Agent, or Firm*—Hamilton, Brook, Smith & Reynolds, P.C.

[57] ABSTRACT

A type mismatch problem in computer programs is said to occur when there is a mismatch between the form or classification of a value encountered during program execution and that anticipated by the program. A method for repairing or testing for many type mismatch problems in programs works by transforming a binary representation of the program into a new binary in which the problem is fixed or identified. The fix or identification is implemented by converting code that operates on variables that can suffer a mismatch into code that correctly accounts for or tests for the mismatch. Static or dynamic correlation methods, and/or control and data flow graphs are used to track certain values, to determine where to install patches and how to adjust branch, jump and procedure call references after patch installation has shifted the target references.

27 Claims, 8 Drawing Sheets

100 {
I1  a=3
I2  b=31
I3  c=a+b
I4  If (c>0
I5    d=c;
I6  else
I7    d=a;
I8  e=c+b
}
FIG. 1A
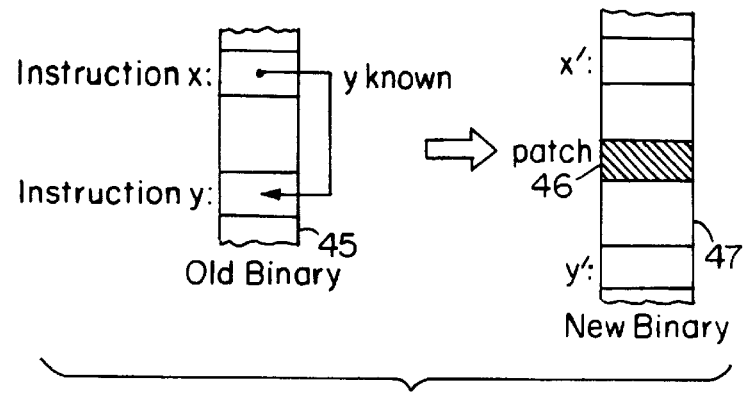
FIG. 2
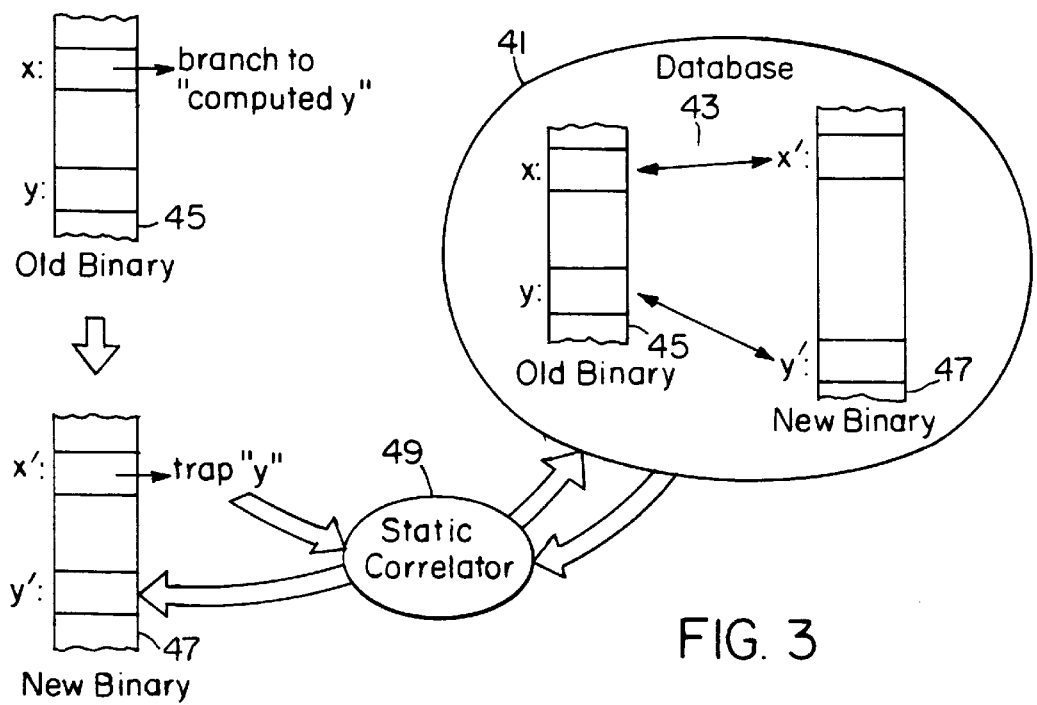
FIG. 3

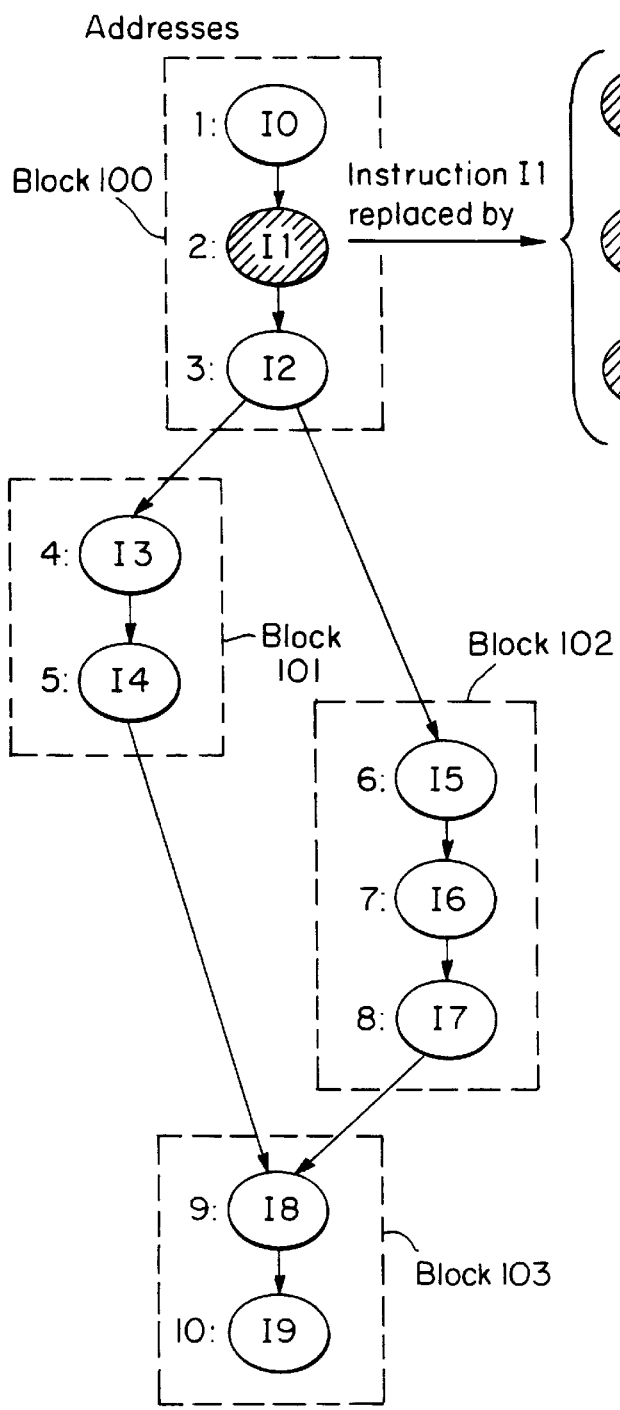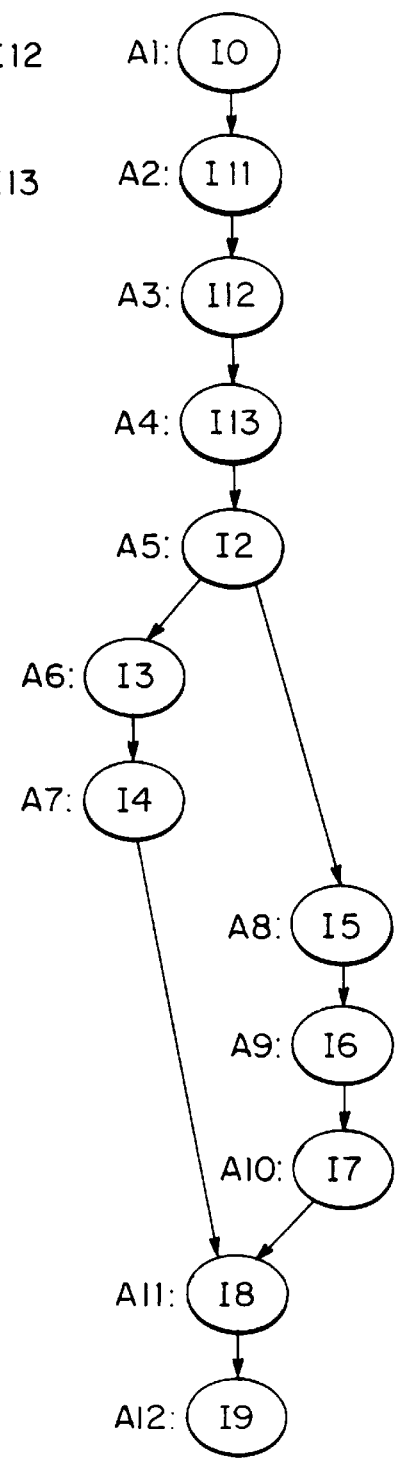
FIG. 8
FIG. 9

TEST PROTECTION, AND REPAIR THROUGH BINARY-CODE AUGMENTATION

BACKGROUND OF THE INVENTION

Although improvements are continually being made in software-development tools, it is still virtually impossible to write completely error-free code. However, a number of sophisticated debugging, protection, repairing and testing techniques exist to help keep these problems to a minimum.

A type error is defined as an error in a program resulting from a mismatch between the form or classification of a value encountered during program execution and that anticipated by the program. Type errors tend to manifest themselves as data value type errors, resulting from, for example, adding two values of different types such as salary and age, or from format differences, e.g., two-digit versus four-digit dates.

For example, a type error problem in a computer program is said to occur when arithmetic performed on data values results in an answer that is too big to be held in the amount of space allocated for the result. For example, a large number of programs written in the 1970s and 1980s allocated two digits to hold a date variable, so that the amount of storage space consumed by date variables would be minimized. The year "1979" would be represented as "79". The "19" would be implicitly assumed. Unfortunately, this method results in serious difficulties as the year 2000 approaches. The problem is that such programs do not distinguish between dates whose first two digits are different: for example, "1979" and "2079". A program might further perform arithmetic on two dates, for example, adding 30 years to the year 1979 represented by "79". When "79 and "30" are added, the result expected by the user is "2009". However, the computer program will produce "09" as its answer since its internal representation of dates uses only two digits. The answer is clearly ambiguous and can result in catastrophic problems if incorrectly interpreted as "1909".

There are many other real-life examples of type error problems. For example, many computer programs represent telephone area codes as three-digit numbers. If in the future, increased demand necessitates four-digit area codes, type error problems will occur. A user might wish to specify a four-digit number, while the computer program accepts only three-digit numbers.

As another example of type error, suppose a program customarily accepts financial data in terms of some currency such as the German mark, which is then replaced by a new European currency. The user would like to specify the new currency, but the program accepts only the older mark.

As yet another type error example, suppose a program accesses a set of data in some environment. When executed in a different environment, a problem occurs when the program is able to access data from files beyond its permissible limit.

Testing for, protecting against, and repairing type errors in computer programs is a difficult task. For an idea of the magnitude of the problem, consider the date problem. There are approximately 500 billion lines of Cobol code in the world. Some fraction of this code is contaminated with the date type error problem. Fixing this problem alone has spawned a large industry in the United States and elsewhere.

While this discussion is focused on the date problem and its solutions, the present invention addresses a much broader class of problems.

By far the predominant method of addressing the type error problem is to manually fix the source programs. This method involves a team of programmers laboriously perusing the source code, finding all locations where, for example, a date variable might be operated upon, and then modifying the code so that the problem is fixed. Many methods exist for fixing source code in this manner.

One method called "expansion" involves expanding all date variable fields to use four digit arithmetic instead of two, and modifying all pertinent instructions to use four-digit arithmetic instead of two-digit arithmetic. This method also requires that all input and output routines correctly handle four digits.

A second method called "windowing" modifies the logic of the program to operate correctly without resorting to longer date fields. This modification might change the program so that all two-digit numbers smaller than 50 are interpreted as being years after or equal to the year 2000, and all two-digit numbers greater than or equal to 50 as being before 2000. For example, the two-digit number "39" would be interpreted as 2039, while the number "79" would be interpreted as 1979. As an example of program logic modification to accomplish this, consider the two dates date1 and date2 assigned values of "04" and "96" respectively, and intended to be interpreted as 2004 and 1996. Suppose the original program subtracted the variable date2 from date1. The original faulty program might naively subtract 96 from 04, resulting in an incorrect number such as −92 years. (Note that a subtraction such as "99" minus "96" would have produced a correct result of 3 years.)

A program modified according to the windowing technique, would produce the current result of 8 years if it saw the pair of inputs 04 and 96. Similarly, the modified program would still produce the correct result of 3 years if it saw the pair of inputs 99 and 96.

In either the windowing or expansion technique, the simplest methods require searching through all of the source code, or using some dynamic method to track corrupted values. One approach to reducing the search space uses program coloring and works as follows. A user might be required to submit the names of all variables that might contain a date. A program flow analysis at the source program level then identifies all regions in the program where data from the named variables might flow and thereby have an effect. The regions of the program where the named variables might have an effect are designated as "colored" regions. The programmer need only look at the colored regions to implement the fixes.

Some methods automatically transform source code so the resulting source code is correct. The automatic method working at the source code level might transform automatically all code sequences to use the correct type of windowing logic.

SUMMARY OF THE INVENTION

The drawback with prior art methods is that they do not work at the binary code level. This can be a serious drawback for several reasons.

First, users often do not have the sources available for their binary codes; they have only the executable binaries. This is often true for legacy codes.

Second, even if some sources are available, the source files for system call routines and other libraries might not be available. This is especially true when users write their own programs leveraging proprietary libraries. Modular programming methodologies, in fact, encourage the use of library modules.

Third, recompiling the instrumented source files is a problem. Often, the user interested in fixing the type error problem might not be the original producer of the code. Thus, the environment in which the user tries to compile the sources might not match exactly the original user's environment, leading to compilation difficulties.

Fourth, recompiling all sources, and then linking them to produce a binary can be extremely time consuming.

Finally, optimization passes in the compiler can often obscure the problem by moving instructions.

The present invention works on program binaries and provides the ultimate end-to-end test. This approach, based on binary code rewriting, works by taking an original binary file and producing a new binary with certain useful properties, which result in test, protection, or repair functions.

For example, a binary representation of the program is transformed into a new binary in which the problem is fixed. The fix is implemented by converting code that operates on variables that contain a type error, into code that correctly accounts for the type error and allocates right-sized data fields to store the resulting values.

The same approach can also be applied to a variety of other applications such as detecting where in a program an type error might occur, and assessing the degree to which a set of tests succeed in exercising problematic code.

In accordance with the present invention, a method of testing, protecting, or correcting binary code comprises generating a control flow representation of the original binary code, defining binary software patches and rewriting the binary code to produce a remediated binary code by installing the software patches at selected locations determined by an analysis of the control flow representation.

Applications to which the present invention can be applied, include, but are not limited to, type error problem detection, repair and testing, assertion checking, coverage testing, continuous testing, bootstrap regression testing, test path identification, date identification, zip code identification, telephone number or area code identification, currency identification, virus protection, and corrupted argument protection.

A preferred embodiment further comprises generating a data flow representation of the binary code, choosing which values or variables to track, and using the data flow representation to track the chosen values or variables, and to further aid in determining where to install the software patches.

The control and data flow representations can always be generated from binary code. However, control and data flow representations can also be generated from the source code when the source code is available.

In the date remediation embodiments, various known techniques, including but not limited to windowing and expansion, can be used.

The original binary code may be executed under interpretation or may be simulated. This can be used to help identify date values and variables, instructions that use dates or targets of branch or jump instructions. If source code is available, date variables and values can be identified from the source code. In either source or binary code, date variables and values can be identified by statistical pattern matching (discussed below), or by identifying system calls which obtain dates. In a database application, date variables and values can be identified by identifying date fields within the database.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A shows a program segment.

FIG. 2 is a block diagram demonstrating modification of branch instructions when the branch target is known.

FIG. 3 is a block diagram demonstrating static target correlation where the branch target is unknown.

FIG. 8 is a control flow graph of a program segment before rewriting.

FIG. 9 is a control flow graph of the program segment of FIG. 8 after rewriting.

DETAILED DESCRIPTION OF THE INVENTION

Figure 1B:
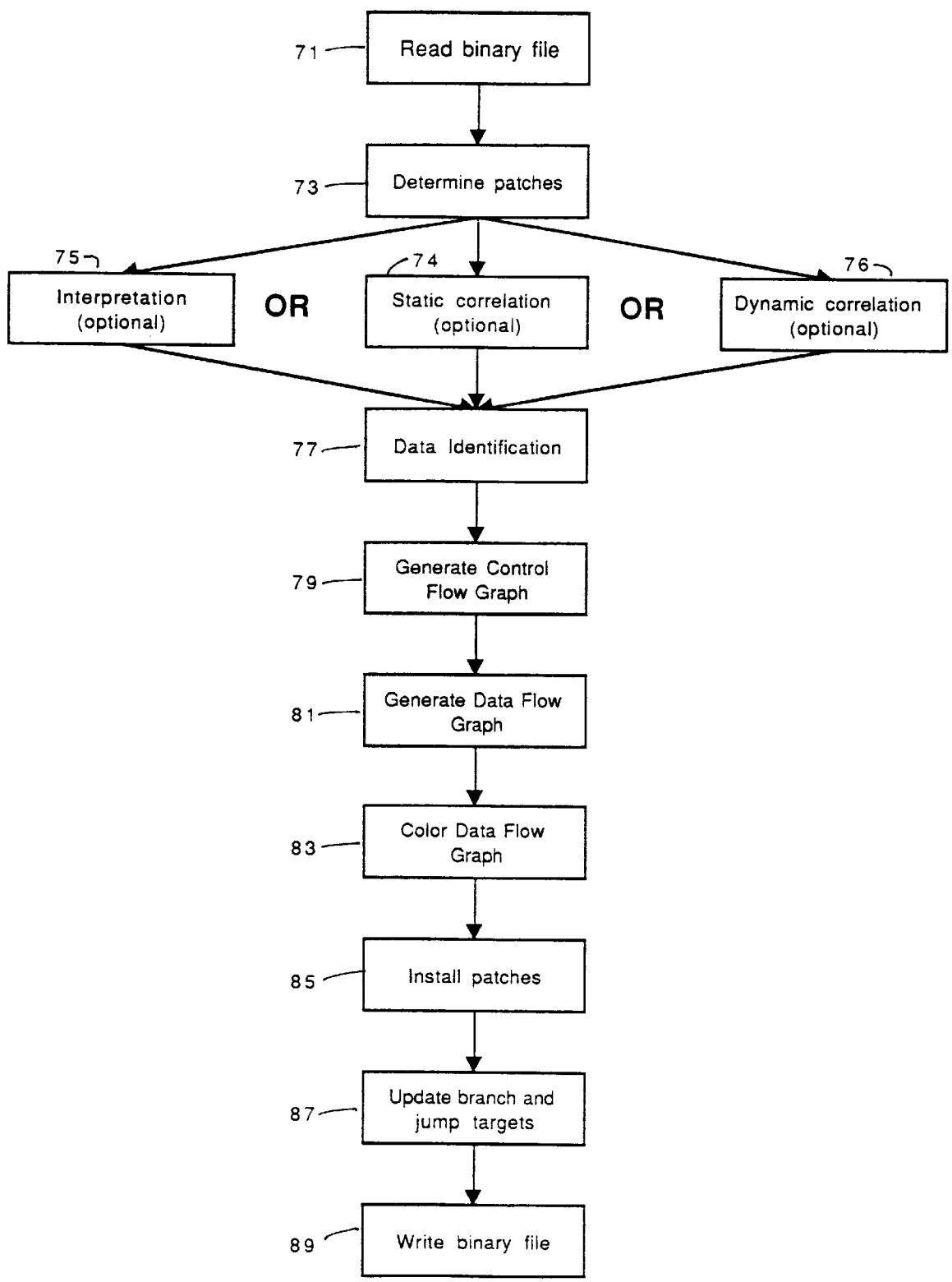
FIG. 1B is a flowchart of a preferred date remediation embodiment.

The present invention instruments original binary code to create augmented or remediated binary code. The augmented or remediated binary code can then perform many useful functions such as error detecting and repair. Standard binary code is the typical executable code generated by most compilers and assemblers. An example of non-standard binary is portable executable format, or PEF, which contains addresses and other symbol table information.

Various embodiments of the present invention can accomplish one or more of the following tasks in combination.

One preferred embodiment performs remediation in which a new binary is produced from a faulty binary wherein a new binary fixes some problem such as argument type mismatch or date type error. In the case of date type error, the fix methodology can adopt the windowing technique, the expansion method, or some other method.

Another preferred embodiment performs assertion checking wherein a faulty or seemingly working binary is instrumented and potential errors are flagged. For example, the instrumentation can look for date-holding registers or memory locations in which the third and fourth digits are zeros and flag a potential error condition so that a user can look at the code and verify whether it is a real problem.

Yet another preferred embodiment performs test certification and coverage. Many users outsource their code to vendors who manually fix some problem. The vendors test the code with a set of tests, and might also provide regression tests to check that the fixes did not break other parts of the code. Running instrumented code can provide a quantitative assessment of the coverage provided by the tests. This method can also flag paths that did not get tested. Coverage information can be provided on a function by function basis.

Another preferred embodiment performs continuous internal value testing. In typical testing, users typically maintain boundary values: input boundary values to drive the program, and output boundary values that can be compared against the values produced by the program. With boundary value testing, multiple internal errors can often cancel their individual effects and thereby hide a real problem. Internal value testing provides a comprehensive testing strategy and can dramatically cut down on the number of tests required to thoroughly test a program.

Yet another preferred embodiment performs bootstrap regression testing. A key problem in testing code is in determining whether a fix made by a programmer has broken other parts of the code. Regression testing is used to determine whether the program behaves in the same way as before for standard operations. Because boundary value testing uses only input and output values, internal states are not fully tested and errors can mask each other. One approach to solving this is bootstrap regression testing. With this approach, the user runs an instrumented original code to produce a sequence of internal states. Then the "fixed" binary is similarly instrumented and run with the same inputs. A corresponding sequence of internal states is produced. This new internal sequence is compared with the old internal sequence. Thus, this method substantially increases the number of tests using a much smaller number of input patterns than would be required without producing a sequence of internal states. Hence, the name bootstrap testing is used.

Another preferred embodiment performs test path identification. In conjunction with user-supplied information such as date entry points, this approach can also analyze the code in order to flag (color) the parts of the program that might get corrupted with, in the case of date remediation, a date variable.

Yet another preferred embodiment called statistical pattern matching performs date identification. Often, when sources are unavailable or when the authors of a given body of code are absent, determining where date entry points lie is a problem. Binary rewriting can be used to determine which operations use dates. The approach is as follows.

The binary is instrumented by installing patches to track the use of a specific number in the program. This specific number can be an input to the instrumented binary. The instrumented binary is then run. The user types in a specific known word, say "66", in place of all the dates that would customarily have been entered. The same method applies to dates read in from a database. In this case the database is modified either manually or automatically using a software tool to use the known words in place of a date.

Now whenever the program notices the value "66" during execution it marks it as a possible date. The program is then run again, and this time the user types in another code word, say "37". The program marks the instructions that use the value "37" or those derived from it. False occurrences of the values "66" or "37" are filtered out by eliminating those instructions that are not common to both the runs. Further similar runs can improve the confidence with which date fields are identified.

While binary rewriting techniques have been utilized for cross-platform execution, the present invention uses binary rewriting for code testing, protection, error flagging, and remediation.

Date Remediation Using the Windowing Method

A date remediation embodiment is described in detail. The same method and its variants can be used for other applications such as those mentioned earlier.

Suppose that a program represents dates using two digits. Let the binary code of the program be termed "original binary". Suppose also that some information regarding the use of dates is known. For example, a user might use the statistical pattern matching method, or a user might know the specific input/output or system call that is made to obtain a date, or if source code is available, the names of the date variables available. Finally the specific input/output calls that can obtain a date from a database record might be known.

The goal is to produce a new "remediated" binary of the program through binary rewriting such that the new binary does not suffer from the date overflow problem. Remediated binary will treat dates correctly.

Assume for this discussion that the windowing method is used for fixing the code. Recall that with the windowing method the program logic is changed so that all two-digit numbers smaller than some number are interpreted as being dates on or after 2000, and two-digit numbers greater than or equal to that number as being before 2000, i.e., in the nineteen hundreds. To be more specific, assume that this threshold is 50.

As an example of applying a windowing technique to the date problem in a sample program, suppose two registers rs1 and rs2 are known to contain dates represented by their low order two digits. The following code subtracts the date in rs2 from the date in rs1 and stores the resulting time difference in years in register rd. Suppose the original faulty code had the following subtraction instruction, which simply subtracts rs2 from rs1 and places the result in rd.

```
*
*
*other code
*
*
sub rs1, rs2, rd;
*
*
*
```

If rs1 contains "04" and rs2 contains "96", then the result of executing the subtraction statement above is the value "-92", placed in rd. If "04" was meant to denote "2004", the answer is clearly wrong. Note, however, that where rs1 is "99" and rs2 is "96", the correct answer "03" is placed in rd.

The date remediation embodiment replaces the original code sequence with the following correct code sequence:

```
*
*
*other code
*
*
if (rs1<50)
rs1=rs1+2000;
else
rs1=rs1+1900;
if (rs2<50)
rs2=rs2+2000;
else
rs2=rs2+1900;
sub rs1, rs2, rd;
if (rs1>=2000)
rs1=rs1-2000;
``` else
rs1=rs1−1900;
if (rs2>=2000)
rs2=rs2−2000;
else
rs2=rs2−1900;

The new sequence first replaces the compressed dates with their correct four-digit interpretations, then subtracts the dates, placing the correct answer in rd. Finally, the four-digit values in rs1 and rs2 are compressed back to their original two-digit form. At the end of this sequence, rd contains the correct difference, and registers rs1 and rs2 are unchanged.

The above example uses pseudo-code for demonstration purposes. However, the present invention works with the binary. The program binary is modified such that original faulty sequences are replaced with correct ones. The new remediated binary replaces the original binary and performs correctly.

Of course, new code cannot be simply inserted or old code removed without due care. Inserting or deleting code will cause subsequent instructions to shift, and jump and absolute branch instructions must be modified as their respective targets shift. Relative branch instructions also need to be changed when code is removed or added between a branch instruction and its target.

Furthermore, branch targets must also be identified when the branch instructions use values that cannot be determined from an analysis of the binary alone.

The complete methodology for date remediation is now discussed. The above example shows how the logic of a program can be modified to correctly compute dates, provided dates fall within a window of time. (Notice the dates earlier then 1950 and later than 2050 cannot be represented in the above approach.)

FIG. 1A shows a small sample program segment 100. In statements I1 and I2, variables a and b are assigned values of "3" and "31" respectively. In statement I3, the values contained in variables a and b are added together and the sum stored in variable c. Thus it can be seen that data from either variable a or b "flows" into variable c. Statement I4 is a conditioned branch. If the value contained in c is greater than 0, statement I5 is executed (setting variable d equal to c), otherwise statement I7 is executed, setting variable d equal to a. It can be seen that both a and b flow to d if statement I5 is executed, but only a flows to d if statement I7 is executed. Finally, statement I8 is executed, setting variable e to the sum of b plus c. For this example, the user might identify variable b as corresponding to a date.

FIG. 1B shows a flow chart of a preferred embodiment using the following steps for date remediation:

1. Execution of binary under interpretation (optional) 75
2. Date identification 77
3. Flow graph generation 79,81
4. Flow graph coloring 83
5. Binary Rewriting 85, 87, 89

Of course, before any repair can be performed, it is necessary to read in the binary file from storage (step 71). Second, it must be determined what patches are to be installed (step 73). This entails knowing what kind of instructions to look for and indicating what these instructions will be replaced with, or how they will be modified.

A control point is defined as any point from which a branch can occur, e.g., a branch or jump instruction, or any branch or jump target. Identifying control points is necessary to be able to modify the branch or jump instructions so they point to the correct targets. In the simplest case, as shown in FIG. 2, the target y of instruction x in the old binary 45 is fixed and known. When a patch 46 is inserted into the new binary 47, target y' is shifted, and instruction x' is modified accordingly.

Although not often necessary, binary interpretation (step 75) helps identify control points when sources are not available. The program is run under interpretation using a set of user inputs, and control transfer points where control is transferred are determined by the interpreter.

Alternatively, binary interpretation (Step 75) can be replaced by a method called static target correlation 74, shown in FIG. 3. In this method, associations 43 of instructions in the old binary 45 with instructions in the new binary 47, for example x←→x' and y←→y', are maintained in a database 41. Branch instructions (x') in the new binary whose targets (y') are unknown are replaced by a trap (or a call or a jump) to a routine, called the static correlator 49, with the dynamically computed target (y) as an argument. The correlator 49 takes this target address (y) and interprets it in the context of the old binary. It then finds the new target address y' in the new binary using the database 41, returning control back to the original execution after replacing the old target y with the new target y'.

Figure 4:
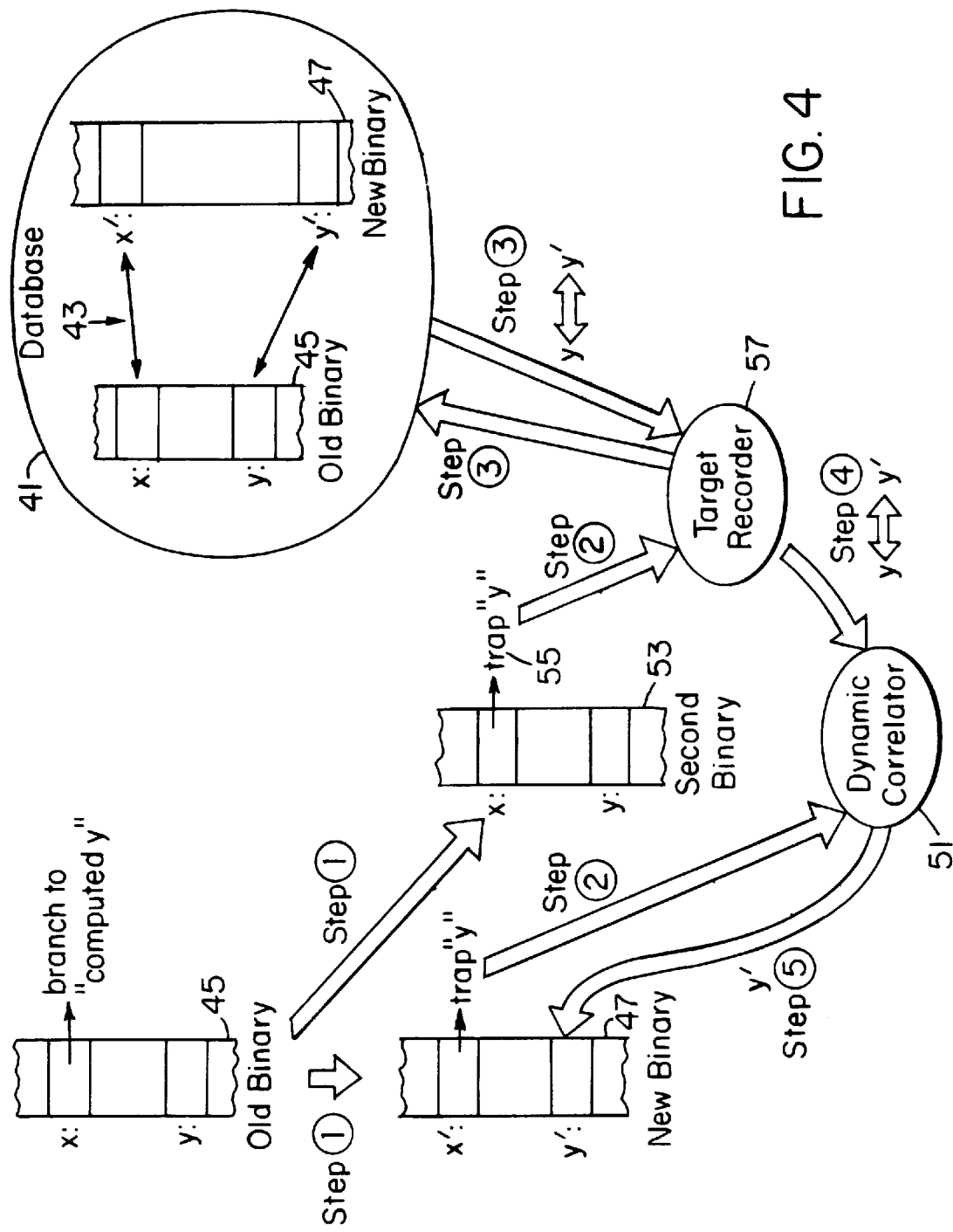
FIG. 4 is a block diagram demonstrating dynamic target correlation where the branch target is unknown.

Further, static target correlation can be replaced by dynamic target correlation 76, shown in detail in FIG. 4. As before, a database is maintained associating 43 instructions in the old binary 45 with instructions in the new binary 47, e.g., y←→y' and x←→x'. Branch instructions in the new binary x' whose targets y' are unknown are replaced by a trap (or a call or a jump) to a routine called the dynamic correlator 51. A second augmented binary 53 is created from the old binary by replacing only branches x whose targets y are unknown, with a trap 55 having the target as an argument, to be handled by a handler called the "target recorder" 57. No instructions are shifted. The second binary 53 is run with the same inputs as the new binary 47 (possibly on a different computer, and possibly at the same time). Both binaries will trap on the same branch (x and x'). The second binary's target recorder 57 will discover the target address y and then correlate this with the corresponding target y' in the new binary using the database, and communicate this information to the dynamic target correlator 51. The dynamic correlator technique is particularly useful in cases where the relevance of y from the old binary 45 is lost in the new binary 47; where for instance, the instrumentation of the old binary 45 to the new binary 47 has rendered the meaning of y obsolete. For example, it may be undeterminable as to whether the value y actually pertains to the old binary 45 or the new binary 47. In such a case, the static correlator cannot produce a meaningful result.

Interpretation can also be used to identify instructions that use dates as follows. The program is run under interpretation and the user types in a specific known word in place of a date, for example, "66". (The same method applies to dates read in from a data base). Now whenever the interpreter notices the value 66 in the program during execution it marks it as a possible date. The program is then run again, and this time the user types in another code word, say 37. The interpreter marks the instructions that use the value 37 or those derived from it. False occurrences of the values 66 or 37 are filtered out by eliminating those instructions that are not common to both runs. Multiple such runs can improve the confidence with which date fields are identified.

In the date identification step 77 some input from the user is preferred. The input helps start the process of identifying date-related computations. Failing input from the user, pattern matching techniques or prior knowledge of the operating system or application can be used to identify an entry point for a date. The interpretive technique discussed above can further help identify dates.

If source code is available, the user can identify variable names that correspond to dates. Alternatively, the user can identify system calls in the source program that obtain a date. A further alternative is to identify from a knowledge of the operating system the specific address of a system routine that is called to obtain a date. Yet another alternative is to identify which fields are dates when database records are read in input/output operations. These addresses, for example, will be used in the next step to determine which instruction in the binary fetches in a date.

The next steps 79,81 are to produce flow graph representations of the program. The goal of this step is to reduce the number of places where binary logic needs to be changed. This has the benefit that the user can get selected information and the program will run faster. A flow graph is also helpful in obtaining various forms of test coverage statistics.

The flow graph can be produced from the source program if the source is available. If not, the flow graph must be produced by analyzing the binary. Again, the interpretation-driven execution discussed above can help with this task when enough data is not available in the binary. The flow graph has a node for every instruction executed by the binary code. Two flow graphs have two different types of edges: control flow edges and data flow edges. The nodes with the control flow edges form the control flow graph 79, and the nodes with the dataflow edges form the data flow graph 81. The control flow and data flow graphs are produced by applying standard compiler techniques.

Figure 5:
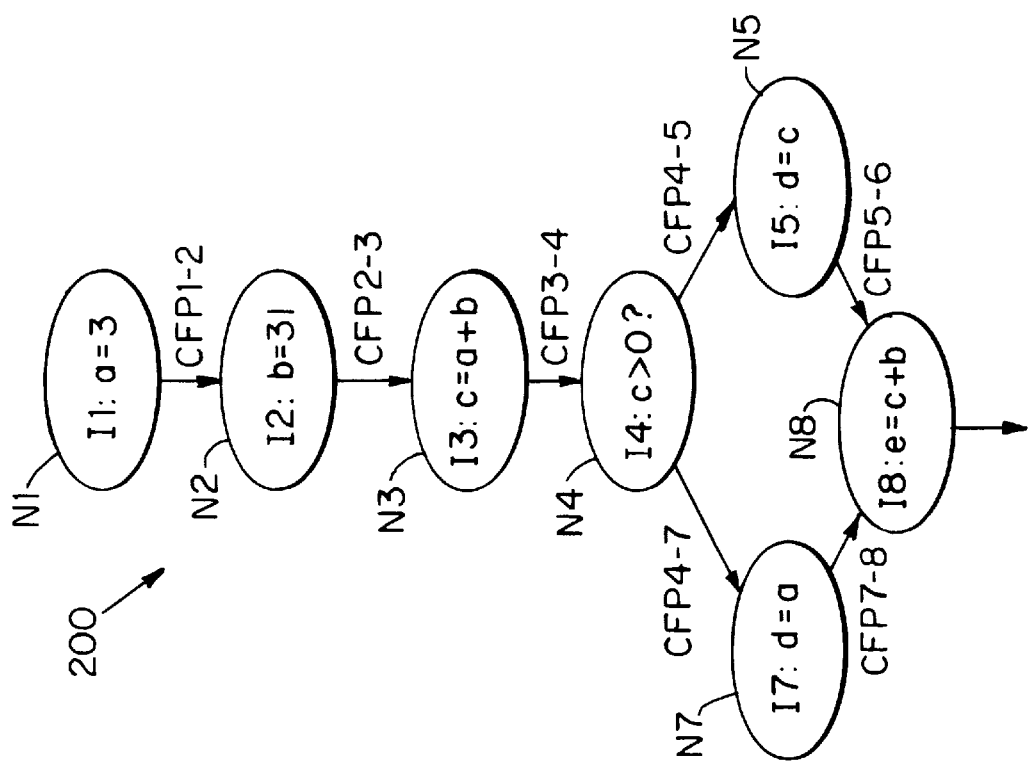
FIG. 5 is a control flow graph of the program segment of FIG. 1A.

FIG. 5 shows the corresponding control flow graph 200 for the program segment of FIG. 1A. The control flow graph 200 has a node for every instruction and control flow edges to indicate the possible sequences of instruction. For example, an instruction I2 that follows a previous instruction I1 has an edge CFP1-2 leading from node N1 to N2. Node N4, corresponding to branch instruction I4, has two edges CFP4-5 and CFP4-7 leading out to two possible target instruction nodes, N5 and N7 respectively. There may be backward edges as well corresponding to backward branches for loops.

Control flow graphs are needed in the binary rewrite phase 89. Control flow graphs are also useful in determining which program blocks are executed when a given set of inputs are applied to the program. A block is a sequence of program instructions without a branch or jump instruction.

Figure 6:
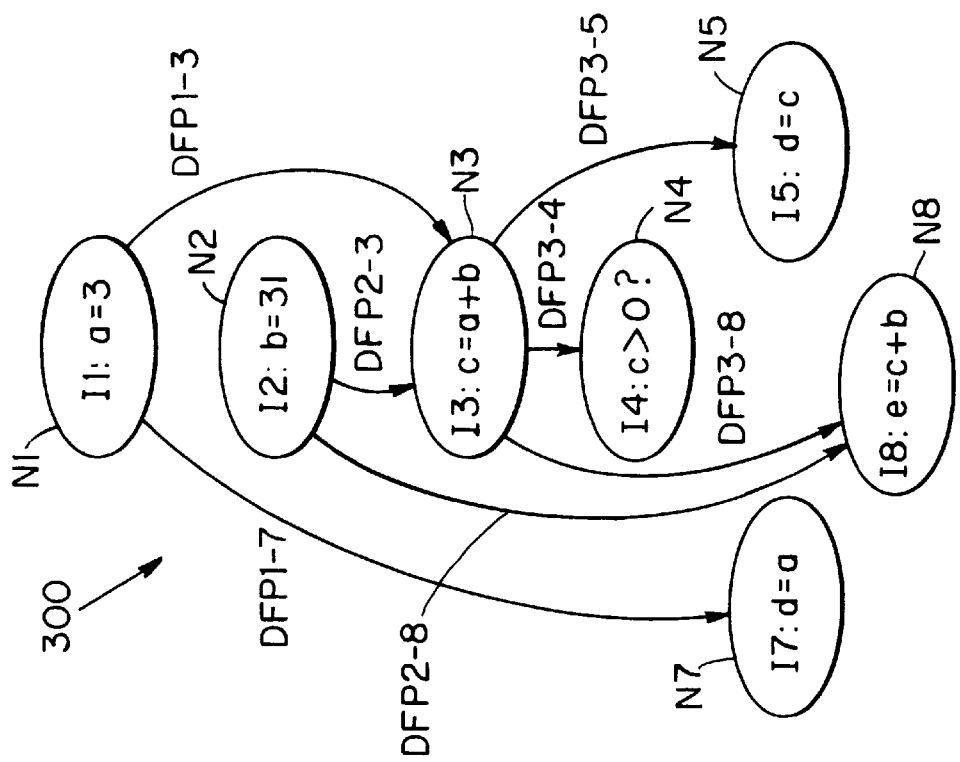
FIG. 6 is a data flow graph of the program segment of FIG. 1A.

FIG. 6 shows the data flow graph 300 for the program segment of FIG. 1A. Data flow graphs are particularly useful for targeting instructions that might use specific types of values, arguments or dates. A data flow graph has nodes and dataflow edges. A data flow edge exists from instruction I to instruction J if instruction I produces a value that is consumed by instruction J.

The data flow graph 300 of FIG. 6 has the same nodes as the control flow graph 200 of FIG. 5. Here, however, the edges indicate data flow. For example, edge DFP1-7 indicates that the value assigned to variable a at node N1 flows into variable d in node N7. The same value flows to or has effect on nodes N3, N4, N5, and N8 through edges DFP1-3, DFP3-4, DFP3-5, and DFP3-8 respectively. Similarly, it can be seen that the value assigned to variable b in node N2 flows down to nodes N3, N4, N5, and N8 via data flow edges DFP2-3, DFP3-4, DFP3-5, and DFP2-8 respectively.

Figure 7:
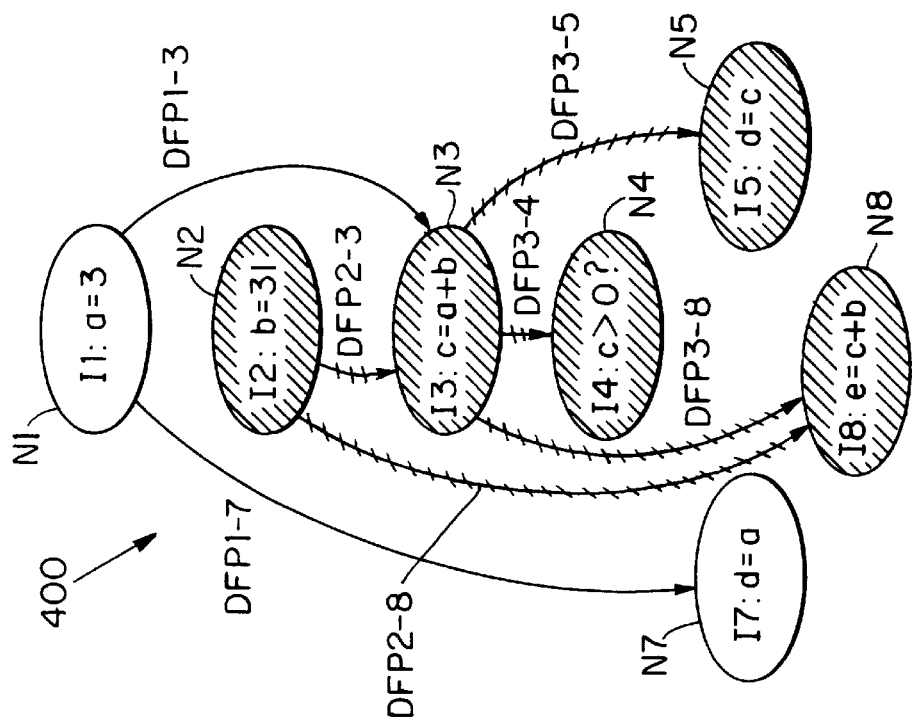
FIG. 7 is a data flow graph similar to that shown in FIG. 6 but further demonstrating the concept of "coloring".

Referring back to FIG. 1B with the aid of the data flow graph, the next step 83 is to identify or "color" the instructions that potentially use dates or selected arguments. Starting with instructions identified as using dates (or specific arguments) or as being instructions that obtain a date through a program input, data analysis is used to mark or color all the instructions that can be contaminated with a date (or with the specific argument). FIG. 7 shows a colored graph 400 for the case where variable b is a date. In this graph, the hashed nodes N2, N3, N4, N5, and N8 correspond to the instructions that may have to be changed.

Again referring to FIG. 1B, the actual rewriting 85, 87, 89 of the binary now takes place. First, the patches are installed 85. Each colored binary instruction is replaced by a set of binary instructions that implement the correct logic. For example, the instruction I3, c=a+b, is replaced in a manner similar to that described earlier.

Next, branch and jump instructions are modified if their targets have shifted. This is necessary because when a single instruction is replaced with multiple instructions, the length of that segment of code increases. Thus, the addresses of blocks that follow the lengthened block will all be shifted. Therefore, the branches, procedure calls and jumps that reach a given line of code, or target, through a given old address must also be changed to reflect the new shifted address. The information contained in the control flow graph becomes very useful at this point.

FIG. 8 shows a control flow graph 500 for a sample program segment before rewriting. This segment comprises ten instructions I0 through I9. Execution is sequential from instruction I0 to I1 and from I1 to I2. However, instruction I2 is a conditional branch from which execution may flow to either instruction I3 or I5 depending on the condition being tested. If the branch to I3 is taken, I4 will also be executed, followed by I8 and I9. If the branch to I5 is taken, I6 and I7 will also be executed. Ultimately, the branches converge, and instructions I8 and I9 are executed.

For this example, instruction I1 at address A2 is assumed to use a date and is therefore shown as colored. If the instruction is rewritten to use three instructions I11, I12, and I13, the code sequence in FIG. 9 results. Because the instructions are laid out in a sequential stream in the binary file the addresses of all the instructions following the original instruction I1 have changed.

Previously instruction I2 tested a condition and branched to instruction I5 at address A6 if the condition was true. Instruction I5 is at address A8 in the rewritten binary. Therefore the branch instruction I2 that has I5 as a target must be changed to use address A8 instead of A5.

Control flow edges are used to determine which instructions need to have their target addresses changed. Thus the binary rewriting step includes patching all the addresses in the binary to use the new addresses of the shifted instructions.

Finally, as shown in step 89 of FIG. 1B, the remediated or instrumented code is written back to storage.

U.S. Pat. No. 4,951,195 to Fogg describes use of flow graphs in simulation and is incorporated herein by reference. U.S. Pat. No. 5,428,786 to Sites, also incorporated herein by reference, discloses a method of branch resolution using flow graphs in translating CISC code to RISC code. Furthermore, two articles by Robert Bedichek are also incorporated herein by reference. The first is "Some Efficient Architecture Simulation Techniques", Proceedings of the Winter 1990 USENIX Conference, pages 53–63, January 1990, which describes a Motorola 88000 simulator. The second is "Talisman: Fast and Accurate multicomputer Simulation", Sigmetrics Conference, 1995, Association for Computing Machinery, which describes a multicomputer system simulator. These articles describe binary translation used in simulation.

Test Certification and Coverage

Another preferred embodiment performs test certification and coverage. Many users outsource their code to vendors who manually fix some problem. The vendors test the fixed code with a suite of tests, and may also perform regression tests to check that the fixes did not break other parts of the code. Running instrumented code can provide a quantitative assessment of the coverage provided by the tests. This method can also flag paths that are not tested.

Figure 11:
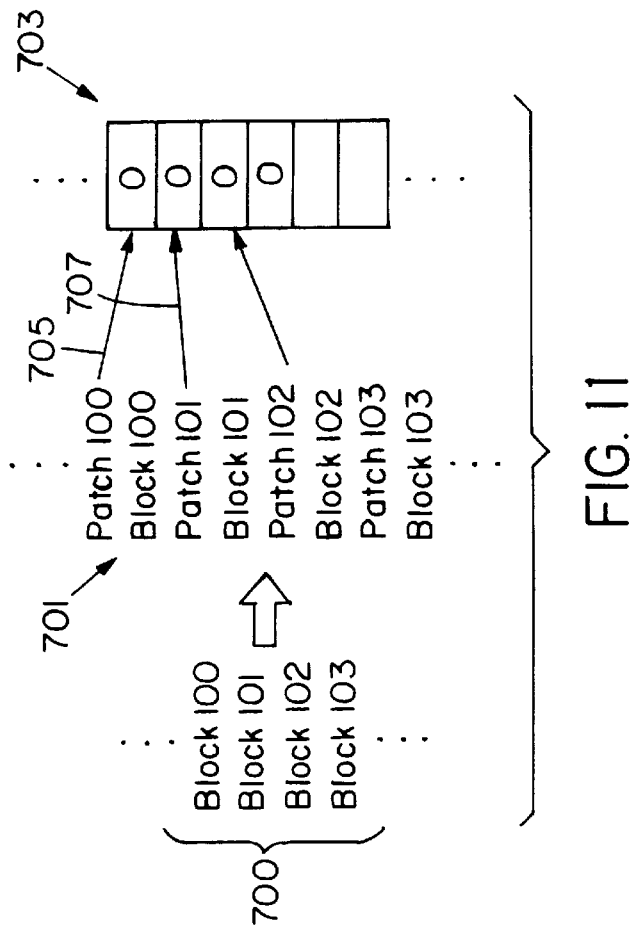
FIG. 11 is a diagram demonstrating test coverage.
Figure 10:
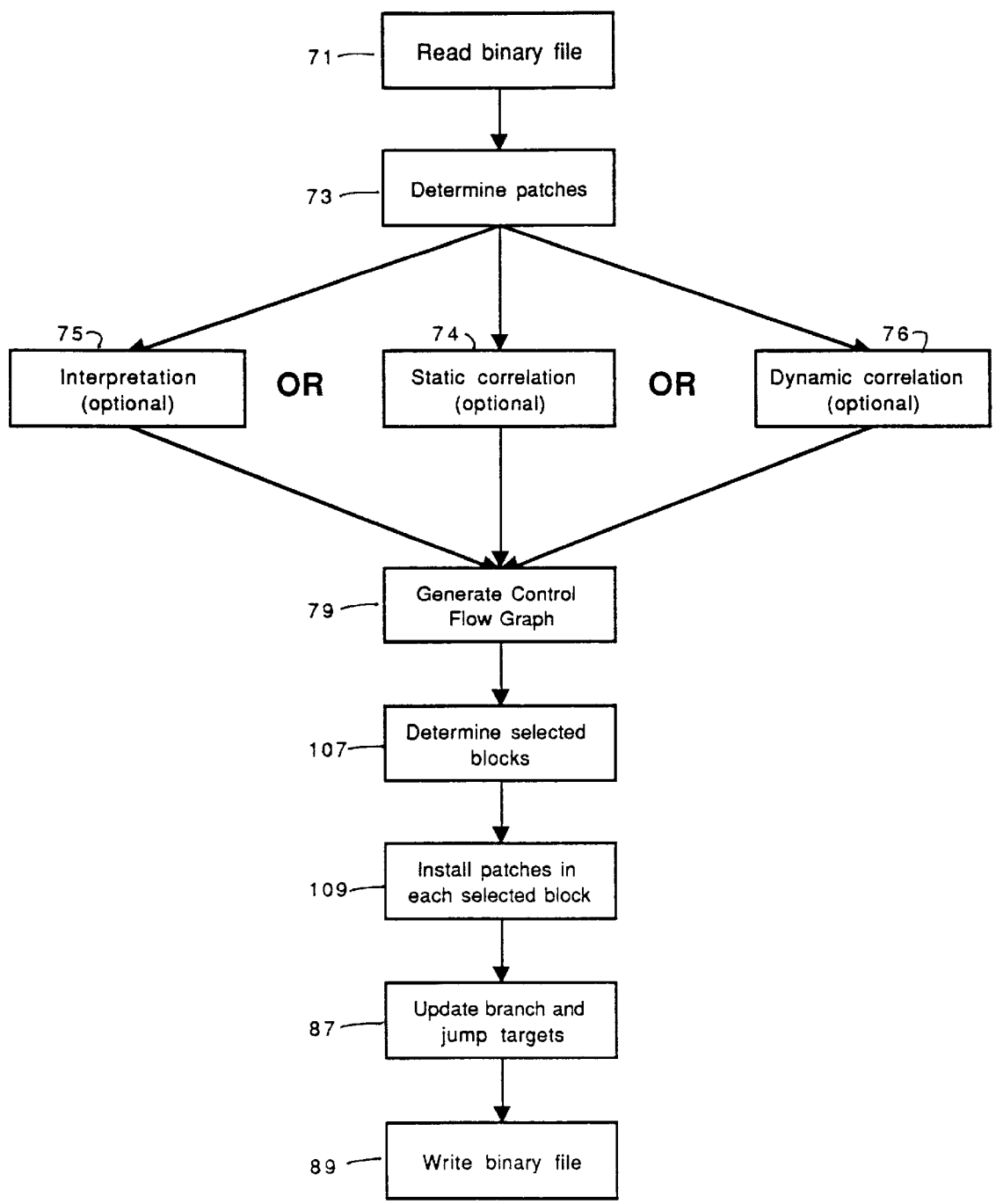
FIG. 10 is a flowchart of a preferred test coverage embodiment.

FIGS. 10 and 11 demonstrate a test coverage implementation. As with the previous embodiment, first the binary must be read in from storage (FIG. 10, step 71). Next, the patches to be installed must be determined 73. Control points are optionally determined by interpretation 75, static correlation 74, or dynamic correlation 76. A control flow graph is then generated (step 79), and the program blocks, or segments without any branch or jump instructions, are determined (step 107).

Referring back to the control flow graph 500 of FIG. 8, this program segment can be subdivided into four instruction blocks, BLOCK1–BLOCK4. BLOCK1 comprises instructions I0, I1 and I2. Control from BLOCK1, as a result of conditional branch instruction I2, may flow either to BLOCK2 or BLOCK3. BLOCK3 comprises two instructions I3, I4, while BLOCK3 comprises three instructions I5, I6, I7. Finally, BLOCK4 comprises two instructions I8, I9, which in this example are executed regardless of whether BLOCK2 or BLOCK3 are executed.

The present embodiment creates an instrumented binary 701 (FIG. 11) from an original binary 700 by inserting a patch PATCH100–PATCH103 at the beginning of each BLOCK100–BLOCK103 respectively (step 109 of FIG. 10). In the patched binary, some memory 703 is allocated for test coverage such that some memory, perhaps a single bit, is associated with each program block. The memory is first initialized to all zeroes as shown. It can be seen that when a block of code such as BLOCK100 is about to be executed, the associated patch PATCH100 executes first. PATCH100 simply sets to 1 the bit in memory associated with BLOCK100. This is shown symbolically with arrow 705. Similarly, when BLOCK101 is about to execute, PATCH101 executes first, setting the bit associated with BLOCK101 as shown by arrow 707. Ultimately, any block of code that has executed will be flagged by having its associated bit set to 1, while any block that has not executed will have its associated bit equal to 0.

Note that other units of memory such as bytes or larger words could just as easily be used. Furthermore, the patches, rather than setting the memory to a fixed value, may increment the value of the associated memory, thereby keeping a count of the number of times a particular block of code has executed.

As with the previous embodiment, branch and jump instructions must be modified to point correctly to their shifted target instructions (step 87 of FIG. 10). Again, this is done with the control flow diagram. Finally, the instrumented code is written back to storage (step 89).

Selective coverage information can be gathered by using data flow graphs and selecting only those paths affected by a given argument. Selective coverage information can also be gathered for specific functions or for modified code. The specific functions can be user-specified.

Figure 12:
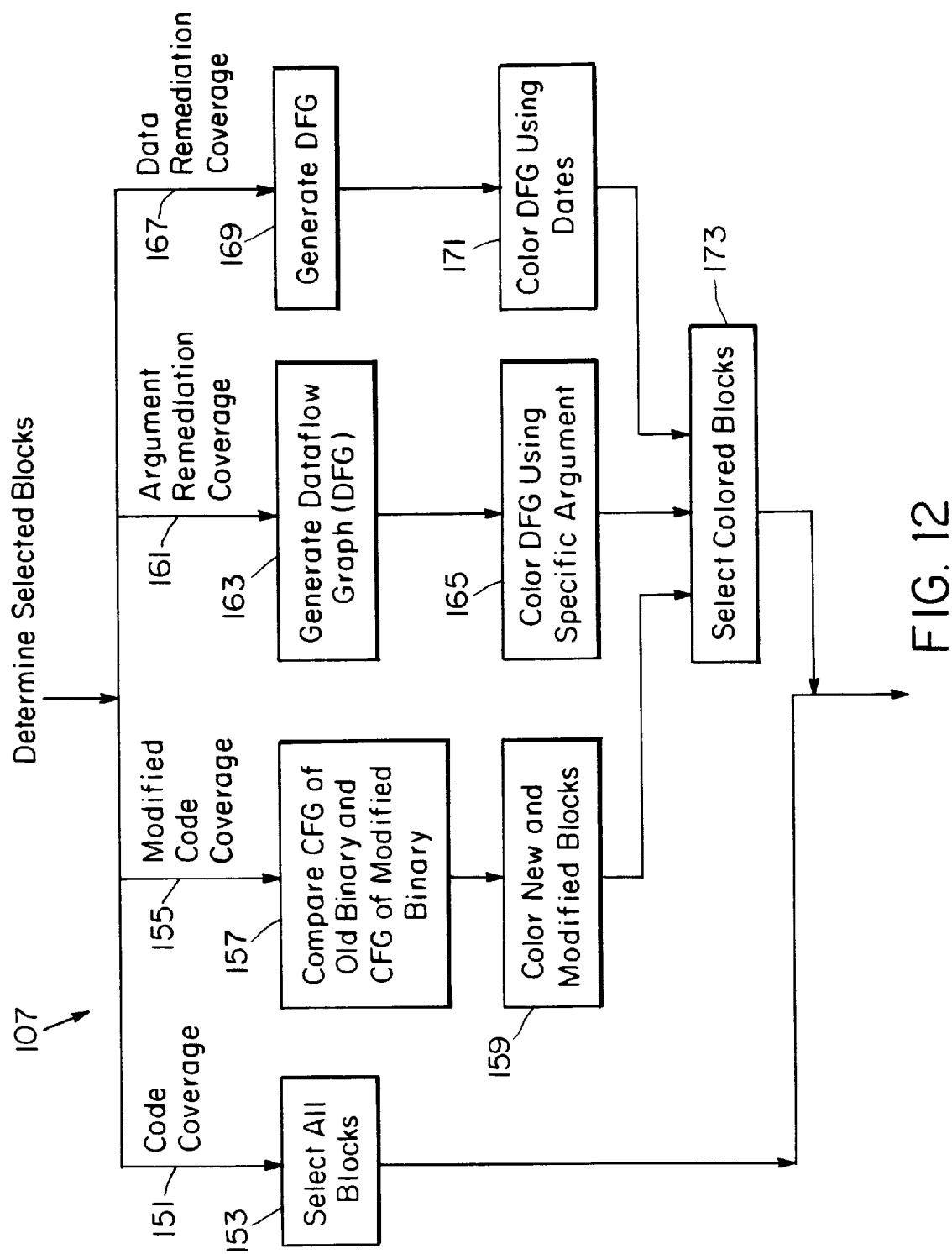
FIG. 12 is a flowchart showing the steps of various test coverage modes.

FIG. 12 is a flowchart showing in more detail the steps that take place within block 107 (of FIG. 10), depending on the testing being performed. If general code coverage testing, as has just been described, is being performed, path 151 is executed and all blocks are selected (step 153).

On the other hand, "modified binary" may be defined as code which has had errors corrected, perhaps by a third party. In this case, it is only necessary to test those parts of the modified binary code which have been affected. For instance, modifying one line of code to fix a bug may affect ten lines of code, so that it is only necessary to test those ten lines rather than the entire program. When this modified code coverage test is being performed, path 155 is executed. In step 157, the control flow graphs of the original binary and the modified binary are compared. New and modified blocks from the modified binary are "colored" in step 159, and finally the colored blocks are selected (step 173). Control flow or data flow analysis can also be used to additionally color lines of code that are affected by the modified or new lines.

Argument remediation coverage testing is similar to modified code coverage testing. In this case, however, the bug fix is related to arguments passed into the program, e.g., entered by a user, such as age. Where the original binary may have accepted age in years, the modified binary may be instrumented to accept an age in months. In this case, path 161 is taken. A data flow graph is generated (step 163) and colored following a specific argument (step 165). Finally, the colored blocks are selected (step 173).

Date remediation coverage test is simply a special case of argument remediation coverage testing, where the argument to be followed is a date. Path 167 is taken. Again, a data flow graph is generated (step 169). Now, the graph is colored using dates (step 171). Finally, the colored blocks are selected (step 173).

Continuous or Internal Value or Self Testing

In typical testing, users typically maintain boundary values: input boundary values to drive the program, and output boundary values that can be compared against the values produced by the program. With boundary value testing, multiple internal errors can often cancel their individual effects and thereby hide a real problem. Internal value testing provides a comprehensive testing strategy and can dramatically cut down on the number of tests required to thoroughly test a program.

With internal value testing or self testing, an instrumented binary completely tests itself. After date-related operations, instrumented code checks error conditions. This form of self checking also provides a measure of protection against both viruses and bad arguments in a production environment.

In a preferred continuous testing embodiment, an instruction checking for data integrity might be inserted. For example, for an original program which uses dates, such as the following:

date.a=3
*
x=date.a+b
* a new instruction may be added to check that the value in date.a is greater than the year 1900. The instrumented code would appear as:

date.a=3
*
if date.a not>1900 then write ERROR
x=date.a+b
*

As the instrumented code is continuously executed, the new instruction is continuously on the look-out for an error condition (the value in date.a is less than 1900), which will be flagged should it occur. Note that although the sample program segments above are shown in pseudo-code, the present invention uses the binary representations. Of course, other kinds of tests are possible. For example, the patch could check that the two significant digits in date.a are either "19" or "20" and flag any case in which this is not true. A patch can test for virtually any condition. A user can also be queried to provide valid ranges for values that can then be used in self-testing.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of testing, protecting, or correcting binary code, comprising:
   generating, from the binary code, a control flow representation of the binary code;
   generating, from the binary code, a data flow representation of the binary code;
   choosing which values or variables to track;
   defining binary software patches;
   determining where to install the software patches based on an analysis of the control flow representation;
   using the data flow representation to track the chosen values or variables, wherein determining where to install the software patches is further based on an analysis of the data flow representation; and
   rewriting the binary code by installing the binary software patches into the original binary code and further modifying the original binary code to account for the installed binary software patches.

2. A method as claimed in claim 1, wherein such method is used to perform overflow detection, repair and test.

3. A method as claimed in claim 1, wherein such method is used to perform assertion checking.

4. A method as claimed in claim 1, wherein such method is used to perform coverage testing.

5. A method as claimed in claim 1, wherein such method is used to perform argument remediation coverage testing.

6. A method as claimed in claim 1, wherein such method is used to perform continuous testing.

7. A method as claimed in claim 1, wherein such method is used to perform bootstrap regression testing.

8. A method as claimed in claim 1, wherein such method is used to perform test path identification.

9. A method as claimed in claim 1, wherein such method is used to perform date identification.

10. A method as claimed in claim 1, wherein such method is used to perform zip code identification.

11. A method as claimed in claim 1, wherein such method is used to perform telephone number or area code identification.

12. A method as claimed in claim 1, wherein such method is used to perform currency identification.

13. A method of testing, protecting, or correcting binary code, comprising:
   generating a control flow representation of the binary code;
   generating a data flow representation of the binary code;
   choosing which values or variables to track;
   defining binary software patches;
   determining where to install the software patches based on an analysis of the control flow representation;
   using the data flow representation to track the chosen values or variables, wherein determining where to install the software patches is further based on an analysis of the data flow representation;
   rewriting the binary code by installing the binary software patches into the original binary code and further modifying the original binary code to account for the installed binary software patches; and
   wherein such method is used to perform date overflow and detection and further comprising the step of identifying date variables and values and wherein the software patches perform a windowing function on date values and variables.

14. A method as claimed in claim 13 wherein date variables and values are identified by identifying variable names in source code.

15. A method as claimed in claim 13 wherein date variables and values are identified by identifying, in source code, system calls which obtain dates.

16. A method as claimed in claim 13 wherein date variables and values are identified by identifying, in the binary code, system calls which obtain dates.

17. A method as claimed in claim 13 wherein date variables and values are indentified by identifing date fields from a database.

18. A method of testing, protecting, or correcting binary code, comprising:
   executing the original binary code under interpretation;
   generating a control flow representation of the binary code;
   defining binary software patches;
   determining where to install the software patches based on an analysis of the control flow representation;
   rewriting the binary code by installing the binary software patches into the original binary code and further modifying the original binary code to account for the installed binary software patches.

19. A method as claimed in claim 18 wherein the step of executing under interpretation is used to identify branch targets.

20. A method as claimed in claim 18 wherein the step of executing under interpretation is used to identify instructions that use dates.

21. A method of testing, protecting, or correcting binary code, comprising;
   generating a control flow representation of the binary code;
   generating a data flow representation of the binary code;
   choosing which values or variables to track;
   defining binary software patches;
   determining where to install the software patches based on an analysis of the control flow representation;
   using the data flow representation to track the chosen values or variables, wherein determining where to install the software patches is further based on an analysis of the data flow representation;
   rewriting the binary code by installing the binary software patches into the original binary code and further modifying the original binary code to account for the installed binary software patches; and wherein such method is used to perform date overflow and detection and further comprises the step of identifying date variables and values and wherein the software patches perform a date expansion function on date values and variables.

22. A method of testing, protecting, or correcting binary code, comprising;

using a static target correlation to identify branch targets;

generating a control flow representation of the binary code;

defining binary software patches;

determining where to install the software patches based on an analysis of the control flow representation; and rewriting the binary code by installing the binary software patches into the original binary code and further modifying the original binary code to account for the installed binary software patches.

23. A method of testing, protecting, or correcting binary code, comprising;

using a dynamic target correlation to identify branch targets;

generating a control flow representation of the binary code;

defining binary software patches;

determining where to install the software patches based on an analysis of the control flow representation; and rewriting the binary code by installing the binary software patches into the original binary code and further modifying the original binary code to account for the installed binary software patches.

24. A data processing system for testing, protecting, or correcting binary code, comprising:

correlation means for identifying control points;

a control flow representation of the binary code;

binary software patches;

means for determining where to install the software patches based on an analysis of the control flow representation; and means for rewriting the binary code by installing the binary software patches into the original binary code and by modifying the original binary code to account for code displacements due to the installed binary software patches.

25. A data processing system as claimed in claim 24, further comprising:

a data flow representation of the binary code;

means for choosing which values or variables to track; and means for using the data flow representation to track the chosen values or variables wherein determining where to install the software patches is further based on an analysis of the data flow representation.

26. A data processing system as claimed in claim 24, wherein said correlation means comprises static target correlation means for identifying control points.

27. A data processing system as claimed in claim 24, wherein said correlation means comprises dynamic target correlation means for identifying control points.

* * * * *